(12) United States Patent
Das Gupta et al.

(10) Patent No.: US 10,067,750 B2
(45) Date of Patent: Sep. 4, 2018

(54) WHOLE-PROGRAM OPTIMIZATION USING DATA FROM PREVIOUS COMPILATION RUNS

(71) Applicant: QUALCOMM Incorporated, San Diego, CA (US)

(72) Inventors: Anshuman Das Gupta, Austin, TX (US); Sergei Larin, Austin, TX (US); Matthew Curtis, Leander, TX (US); Ron Lieberman, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/628,532

(22) Filed: Feb. 23, 2015

(65) Prior Publication Data

US 2016/0246580 A1     Aug. 25, 2016

(51) Int. Cl.
*G06F 9/45* (2006.01)
*G06F 8/41* (2018.01)

(52) U.S. Cl.
CPC .......... *G06F 8/443* (2013.01); *G06F 8/4441* (2013.01)

(58) Field of Classification Search
CPC ..... G06F 8/41; G06F 8/48; G06F 8/61; G06F 9/5055; G06F 8/4434; G06F 9/528; G06F 8/443; G06F 8/4441
See application file for complete search history.

(56) References Cited

U.S. PATENT DOCUMENTS

| 5,175,856 | A | * | 12/1992 | Van Dyke | G06F 8/41 711/E12.006 |
|---|---|---|---|---|---|
| 6,308,320 | B1 | * | 10/2001 | Burch | G06F 8/48 717/145 |
| 2003/0023961 | A1 | * | 1/2003 | Barsness | G06F 8/443 717/152 |
| 2009/0327291 | A1 | * | 12/2009 | Levanoni | G06F 9/528 |
| 2010/0313079 | A1 | * | 12/2010 | Beretta | G06F 9/5055 714/48 |
| 2014/0245290 | A1 | * | 8/2014 | Gupta | G06F 8/61 717/178 |

* cited by examiner

*Primary Examiner* — Tuan Vu

(74) *Attorney, Agent, or Firm* — Haynes and Boone, LLP

(57) ABSTRACT

An example system for compiling a source file includes an optimizer that identifies a segment of code in a first source file as a potential optimization opportunity. The first source file includes high-level source code. The example system also includes a compiler that identifies a compilation record storing data indicating that the segment of code is an actual optimization opportunity and generates a representation of the high-level source code in accordance with the actual optimization opportunity. The data is based on a previous compilation of a second source file.

19 Claims, 8 Drawing Sheets

10,067,750 B2

WHOLE-PROGRAM OPTIMIZATION USING DATA FROM PREVIOUS COMPILATION RUNS

FIELD OF DISCLOSURE

The present disclosure generally relates to compilers, and more particularly to code optimization during compilation.

BACKGROUND

A compiler is a program that takes one representation of a program as its input and produces a different representation of the same program. Compilers typically transform programs from a high-level, human-readable form into a lower-level, machine-readable form. The input representation may be a text file containing code that complies with the specifications of a particular high-level programming language (e.g., in the C or C++ programming language). The output representation is usually a lower-level translation of the same program (e.g., machine or assembly code). Such lower-level representation is usually read by hardware or software, and rarely by people.

During the translation process, compilers usually go through numerous improvement or optimization steps that take advantage of the compiler's "understanding" of the program and employ various techniques to improve the code's efficiency. In an example, during translation, compilers conduct a process of improving the generated assembly code to enhance different characteristics such as performance or code size. Compilers typically perform the translation and optimization at a function scope for a given file. For example, a compiler may read and analyze each function in the high-level source code and then translate the function into assembly code. In this way, the compiler may optimize the code it generates within a function.

BRIEF SUMMARY

This disclosure relates to compiler optimizations. Methods, systems, and techniques for compiling a source file are provided.

According to an embodiment, a method of compiling a source file includes identifying a segment of code in a first source file of high-level source code as a potential optimization opportunity. The method further includes identifying a compilation record storing data indicating that the segment of code is an actual optimization opportunity. The data is based on a previous compilation of a second source file. The method also includes generating a representation of the high-level source code in accordance with the actual optimization opportunity.

According to another embodiment, a system for compiling a source file includes an optimizer that identifies a segment of code in a first source file as a potential optimization opportunity. The first source file includes high-level source code. The example system also includes a compiler that identifies a compilation record storing data indicating that the segment of code is an actual optimization opportunity and generates a representation of the high-level source code in accordance with the actual optimization opportunity. The data is based on a previous compilation of a second source file.

According to another embodiment, a computer-readable medium has stored thereon computer-executable instructions for performing operations including: identifying a segment of code in a first source file of high-level source code as a potential optimization opportunity; identifying a compilation record storing data indicating that the segment of code is an actual optimization opportunity, where the data is based on a previous compilation of a second source file; and generating a representation of the high-level source code in accordance with the actual optimization opportunity.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
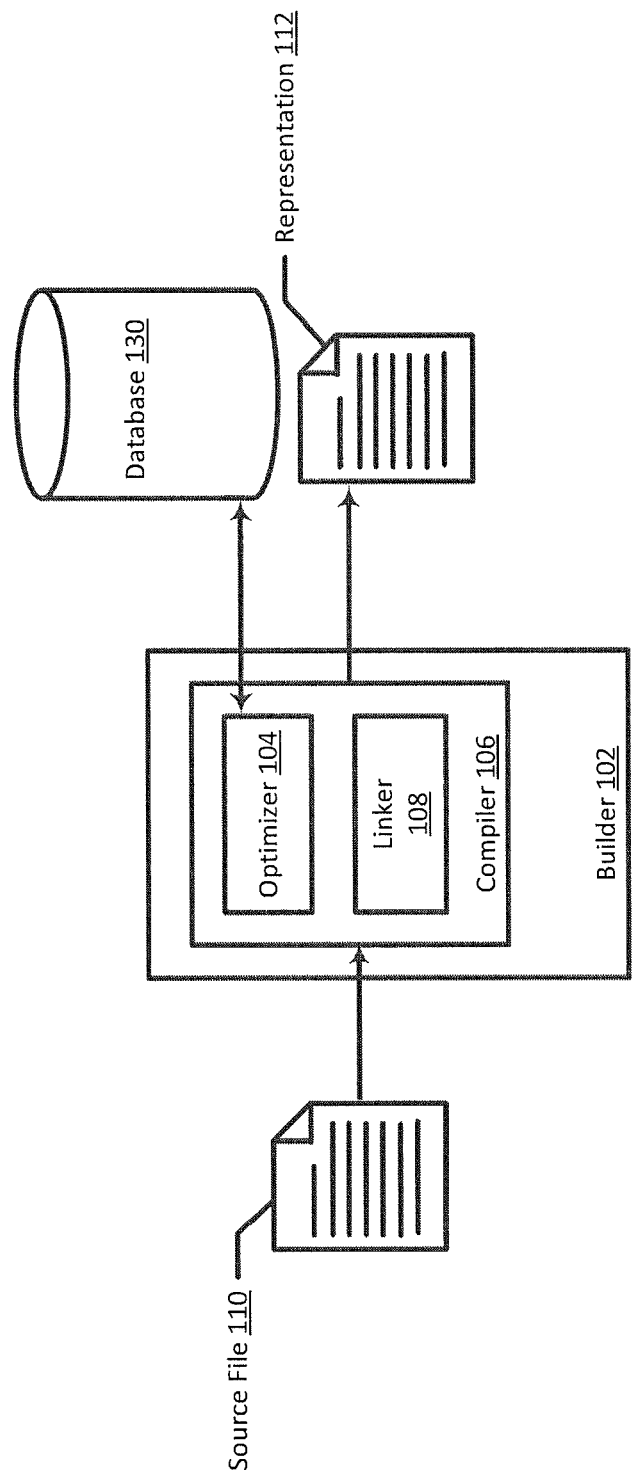
FIG. 1 is a simplified block diagram illustrating a system for compiling a source file including high-level source code, according to some embodiments.

I. Overview
II. Example System Architecture
III. Example Logical Flow of Compilation Process
IV. Compiler Optimizations
  A. Initial Compilation Run
  B. One or More Subsequent Compilation Runs
    1. Identify and Store Optimization Opportunities
    2. Compile Current Source File
  C. Example of Compilation of Separate Libraries
  D. Link the Libraries
  E. Subsequent Program Build
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A program may be composed of multiple source files that are compiled independently from each other. Each compilation of a source file may be referred to as a compilation run. Information between different compilation runs is typically not exchanged because the two compilation runs are of a different scope. For example, if a compiler compiles a first source file and then a second source file independently, information based on the compilation of the first source file is typically not passed into and used for the compilation of the second source file. As such, data that is identified during the compilation of the first source file, and that may helpful in optimizing the compilation of the second source file may be unknown to the compiler when it compiles the second source file. As such, it may be difficult to optimize code between compilation runs.

It may be desirable for a compiler to analyze and optimize code across function and file boundaries. A conventional technique that conducts optimizations across file boundaries uses a combination of serializing the intermediate representation (IR) emitted by the compiler, reading the IR back in at link time, and further optimizing and compiling the collection of IRs at link time. While this conventional technique can be effective, it may also be impractical for compiling large code bases and may involve significant changes to an existing build system. Additionally, it can be prone to excessive compile time and demanding requirements to the host compiling platform. It may be desirable to provide a whole-program optimization mechanism that transfers information between compilation runs and provides a global view of the optimization opportunities across compilation runs, while being transparent to the user. An optimization opportunity may refer to a section of code in a source file that may be optimized during the program build.

The present disclosure provides techniques to provide a global view of the compilation process while building a program that is composed of multiple source files. In some embodiments, the whole program may be optimized and is not confined to a per library operational mode due to memory or time constraints. At least two of the source files may include interdependent code, where code from one source file is used or referenced by another source file. In some embodiments, a compiler uses a database to maintain state across compilation runs. For example, the compiler may initiate compilation of the first source file including source code and collect, based on translating the source code into another representation, data that may be relevant to optimizing the compilation of other source files. In this example, the compiler may identify a segment of code or some code property in the first source file as a potential optimization opportunity and store the collected data in the database. Data based on the identified segment of code may be stored in the database and used to optimize the same or other code fragments during the same or other compilations. Accordingly, data may be passed between different areas of the program to optimize it.

A tradeoff may exist between reading and compiling the whole program at once (which is often impossible due to time, memory, and complexity requirements) and caching relevant global information along with code and using it to improve global compilation quality. An embodiment of the disclosure may be particularly useful for a large program composed of large libraries and/or source files and/or integrated with version control software because it may be unnecessary to store the whole program in memory to achieve these optimizations.

An example system for compiling a source file includes an optimizer that identifies a segment of code in a first source file as a potential optimization opportunity. The first source file includes high-level source code. The example system also includes a compiler that obtains the first source file, identifies a compilation record storing data indicating that the segment of code is an actual optimization opportunity, and generates a representation of the high-level source code in accordance with the actual optimization opportunity. The data is based on a previous compilation of a second source file.

II. Example System Architecture

FIG. 1 is a simplified block diagram illustrating a system for compiling a source file 110 including high-level source code, according to some embodiments. FIG. 1 includes a builder 102 that may be used to build a program. The program may be composed of one or more libraries, with each library including one or more source files.

Builder 102 includes a compiler 106 including an optimizer 104 and linker 108. Compiler 106 accepts a source file 110 including source code as an input and compiles the source code into a lower-level representation. Source file 110 may be part of a program that is written in a high-level programming language (e.g., C or C++) and may be represented as a text file or a logically related group of text files. Compiler 106 may receive source file 110 over a network or retrieve source file 110 from a storage device that is local to the computing device on which builder 102 executes.

Compiler 106 compiles source file 110 into a representation 112. In particular, compiler 106 may generate a representation of the source file by generating a representation of the high-level source code included in the source file. In the present disclosure, a "source file" and the "source code included in the source file" may be used interchangeably unless otherwise noted. Representation 112 is a lower-level representation of source file 110. In an example, representation 112 is an intermediate representation of source file 110. In another example, representation 112 is an object code representation of source file 110. Linker 108 combines the lower-level representation files generated by compiler 106 to create a single executable file. Linker 108 may link multiple libraries together by resolving references in the compiled files and may link them to an executable file.

Database 130 stores information regarding one or more compilation runs, and compilation processes may access the database for a specific program build. In some embodiments, during the compilation phase, optimizer 104 identifies a segment of code in source file 110 as a potential optimization opportunity and stores data based on the segment of code in database 130. The database may be populated during compilation when optimization opportunities arise, and the data may be used in a subsequent and independent compilation of another source file to optimize code across files, as will be explained further below. The segment of code may be, for example, a function that may be merged with another function (function merging), a function that may be abstracted, arguments that may be wrapped, a number of call sites for a particular global symbol, or a size of a locally defined global symbol. Function merging, function abstraction, argument wrapping, function inlining, and global dead code elimination are example optimizations that may benefit from a global view of the compilation process while the program is being built. In some embodiments, database 130 has independent sections for different optimizations (e.g., function merging, function abstraction, and argument wrapping), and other statistics may be used for multiple optimizations.

III. Example Logical Flow of Compilation Process

Figure 2:
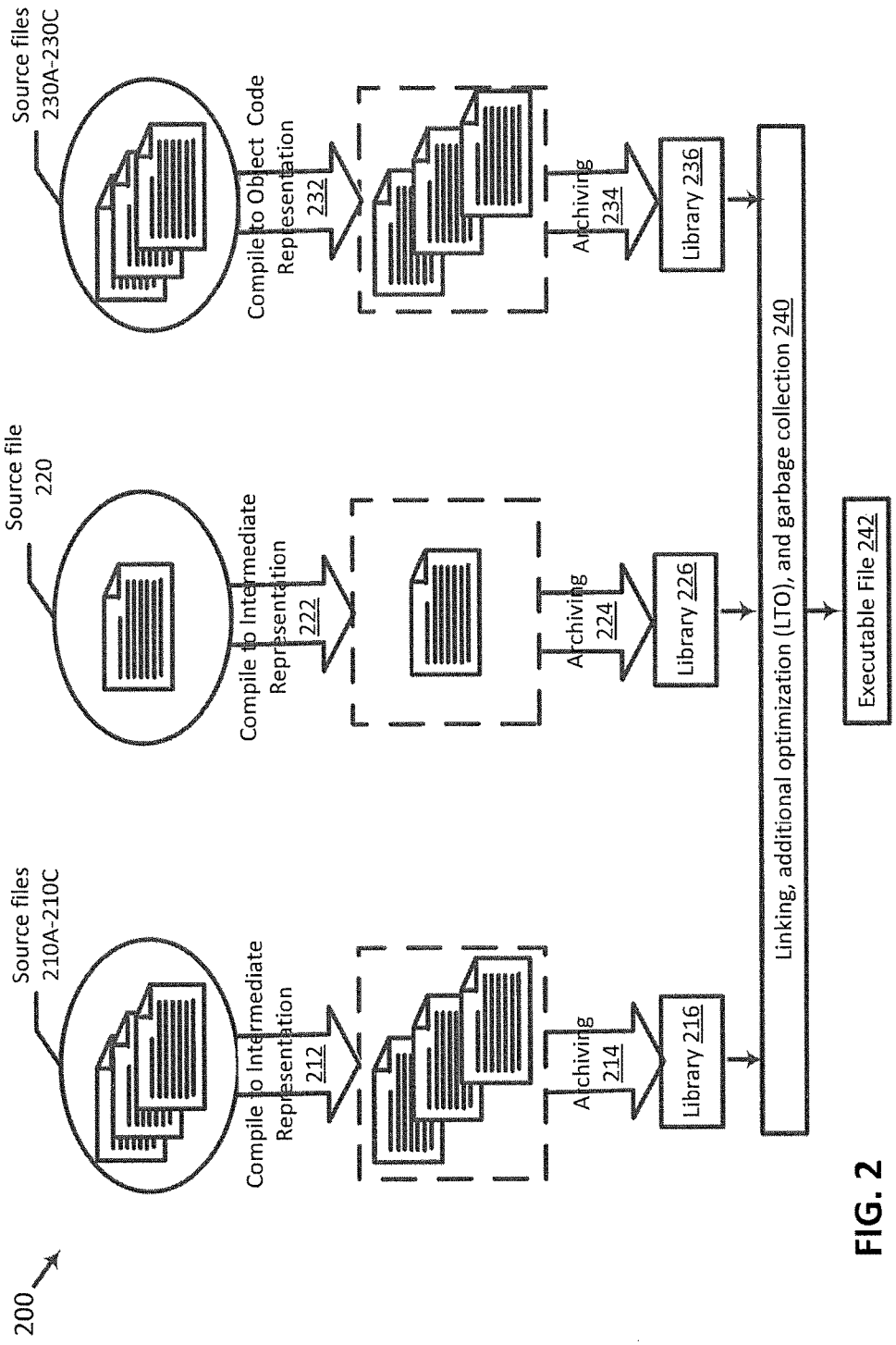
FIG. 2 is a logical flow of a compilation process, according to some embodiments.

FIG. 2 is a logical flow of a compilation process 200, according to some embodiments. FIG. 2 includes a set of source files including source files 210A-210C, a set of source files including source file 220, and a set of source files including source files 230A-230C. A program may be composed of source files 210A-210C, 220, and 230A-230C and may be built using building tools such as builder 102.

The first stage of the program build may include translating the high-level source code included in the sources files into a lower-level representation. During the first stage of the program build, optimizer 104 may identify a segment of code in a current source file as a potential optimization opportunity, and compiler 106 may search database 130 to determine whether the potential optimization opportunity is an actual optimization opportunity. In particular, compiler 106 may search database 130 to determine whether data collected during previous compilation runs indicates that the identified segment of code in the current source file can be optimized. The potential optimization opportunity may be determined to be an actual optimization opportunity if, for example, database 130 stores data indicating that the segment of code can be optimized.

If the potential optimization opportunity is an actual optimization opportunity, compiler 106 compiles the current source file in accordance with the actual optimization opportunity. In an example, compiler 106 compiles the current source file in accordance with the actual optimization opportunity by using the data in the compilation record to optimize the lower-level representation of the source file. In another example, compiler 106 compiles the current source file in accordance with the actual optimization opportunity by including an indication in the lower-level representation of the source file how it can be optimized. Accordingly, compiler 106 may optimize source files across file boundaries and use information gathered across different compilation runs, and the optimizations to the executable file may be done on a global scope and in relation to the whole program.

Additionally, during the first stage of the program build, optimizer 104 collects data on the compilation of the current source file and stores the data in database 130. The data may be based on the segments of code identified as potential optimization opportunities, and compiler 106 may use the data to optimize subsequent compilations of source files at a later point in time. Accordingly, information may be exchanged on a global scale that is outside of file and functional boundaries while not requiring the whole program to be in memory at the same time.

In FIG. 2, at an action 212, compiler 106 may obtain source files 210A-210C (e.g., a_01.c, a_02.c, and a_03.c, respectively) and translate them into an intermediate representation (e.g., a_01.bc, a_02.bc, and a_03.bc, respectively) that may use data based on previously identified optimization opportunities stored in database 130 and gathered from a different compilation run. At an action 214, the intermediate representation may be archived into a library 216 (e.g., a.lib). At an action 222, compiler 106 may obtain source file 220 (e.g., b_01.c) and translate it into an intermediate representation (e.g., b_01.bc) that may use data based on previously identified optimization opportunities stored in database 130 and gathered from a different compilation run. At an action 224, the intermediate representation may be archived into a library 226 (e.g., b.lib). At an action 232, compiler 106 may obtain source files 230A-230C (e.g., c_01.c, c_02.c, and c_03.c, respectively), translate them into an intermediate representation (e.g., c_01.bc, c_02.bc, and c_03.bc, respectively) (not shown), and translate the intermediate representation into an object code representation (e.g., c_01.0, c_02.0, and c_03.0, respectively) that may use data based on previously identified optimization opportunities stored in database 130 and gathered from a different compilation run. At an action 234, the object code representation may be archived into a library 236 (e.g., c.lib).

The second stage of the program build may include performing an action 240, in which linker 108 links libraries 216, 226, and 236 together, performs additional link-time optimizations (LTO) on the linked libraries, and performs garbage collection. The LTOs may be performed on a single file at a time without other program files or modules present in memory. Global optimizations may be performed on a single source file at a time. The input to the linking stage is the collection of libraries (e.g., libraries 216, 226, and 236) created by the previously completed compiling stage. In an example, linker 108 resolves references in the code and links libraries 216, 226, and 236 together. The linked libraries provide global scope visibility on how to optimize the executable file. In particular, during the second stage of the program build, builder 102 may have the best chance to optimize redundant code or code that does not change. Accordingly, it may be desirable to not blindly link all of the content included in libraries 216, 226, and 236 so as to optimize the code linking and the resulting executable file.

Linker 108 may perform the optimizations during the LTO stage. If LTO is performed, some actions that are performed during the compiling stage occur during the linking stage. During this modified LTO stage, information between different compilation runs may be exchanged and an executable file may be generated based on the exchanged information. In particular, some of the code may be "undone" or additional processing may be performed based on the information collected from optimizer 104 during one or more previous source file compilations.

In an example, a segment of code in a first source file defines a function that returns a constant value, and a segment of code in a second source file makes a call to that function defined in the first source file. In this example, if the first and second source files are compiled separately, how the function is used in the first source file may be unknown when compiling the second source file. The present disclosure provides techniques that allow information between the first and second source files to be passed to each other so as to optimize compilation of at least one of these source files.

For example, during compilation of the first source file, optimizer 104 may identify the defined function in the first source file as a potential optimization opportunity and store data based on the defined function (e.g., function name and the constant value returned) in database 130. During a subsequent compilation of the second source file, optimizer 104 may recognize that the second source file includes a call to a function that is defined externally (in this example, the first source file) and may accordingly identify the function call as a potential optimization opportunity. It may be desirable to optimize the compilation of the second source file by replacing each call to the function with the constant value such that executable file 242 no longer contains a call to that function.

Compiler 106 may use the data stored in database 130 to compile the second source file and take advantage of the optimization opportunities that were recognized while compiling previous source files (e.g., the first source file). In particular, optimizer 104 may identify the function call in the second source file as a potential optimization opportunity, and compiler 106 may determine whether database 130 includes a compilation record storing data indicating that the function call is an actual optimization opportunity. A compilation record may store any information that is useful for global scope optimization. For example, a compilation record may store duplicate function hash values, known global constant values, or inline assist statistics (e.g., a number of calls to a particular function), as will be further described below.

In keeping with the above example, database 130 may store a compilation record indicating that the function returns a constant value and corresponding to the segment of code in the second source file (the call to the function). Thus, the function call is an actual optimization opportunity because the compilation record indicates that the function call can be optimized and replaced with the constant value. In response to identifying a compilation record that stores data indicating that the function call is an actual optimization opportunity, compiler 106 generates a lower-level representation of the second source file in accordance with the actual optimization opportunity. In this example, the representation may include an indication that the second source file may be optimized by replacing the function call with the constant value. For example, the compiler may mark the function call in the generated lower-level representation of the second source file as being replaceable with the constant value.

Additionally, optimizer 104 may store a compilation record in database 130 for the second source file, where the compilation record includes data based on the function call in the second source file. The data may include the function name and statistical information (e.g., a number of calls to the function from the second source file).

During the second stage of the program build, linker 108 may identify each actual optimization opportunity indicated in the compiled file and make a call to compiler 120 to cause it to optimize the compiled file in accordance with the actual optimization opportunity. In an example, linker 108 may identify each call to the function (e.g., by the mark) in the compiled file (e.g., intermediate representation file or object code file) and make a call to compiler 120 to cause it to replace the function call with the constant value in the compiled file, thus optimizing the compiled file. Linker 108 links the optimized compiled file, which includes the constant value in lieu of the function call, along with other compiled files to executable file 242. Accordingly, executable file 242 is optimized because it includes the constant value in place of the function call.

The above examples are not intended to be limiting and are merely examples of segments of code that may benefit from the teachings in the disclosure. For example, although the source files are illustrated as belonging to the same library (e.g., library 236 in FIG. 2), this is not intended to be limiting and source files 230A-230C may belong to different libraries. The present disclosure provides techniques to use linking properties to achieve effective use of the LTO stage without extra functionality or cost to implement. For example, it may be unnecessary for the user to change the existing build system for existing software to accommodate whole program optimization. Rather, the optimization may be transparent to the user and performed by the compiler, during normal or link time initiated optimization and lower level code generation.

An advantage of an embodiment may provide for robustness in the presence of database corruption. For example, it may be unnecessary to verify that the database is not corrupt or that the database contains correct data. This may be important to ensuring that the whole program optimization technique is transparent to the compiler user. For example, it may be unnecessary to place constraints on the location of database 130; rather, its location may be arbitrary.

For example, if database 130 is placed in a temporary directory, the operating system can choose to delete that file between the uses of the file by different compiler invocations. The present disclosure provides compiler optimizations that may be designed in a manner that maintains the integrity and correctness of the transformation in the presence of incorrect data from the database. For example, optimizer 104 may identify a segment of code as a potential optimization opportunity, where the segment of code may potentially be abstracted out into a new containing function. While identifying these segments of code, the compiler may query the database to determine whether such a common block of code existed and was abstracted out from another source file in the current program being compiled. If the query confirms that such a segment of code exists, the compiler may abstract the code block into a containing function "F," which may be marked as a weak linkage function.

If the database is corrupted and the results of the query were incorrect, function "F" may be preserved in the compiled file and would not be compromised in relation to the correctness of the whole program optimization. Although the code may contain an additional function, the behavior of the representation of source code generated by the compiler may maintain its correctness. If the database is not corrupted, the function "F" may be deleted by linker 108 during the garbage collection in the linking stage (e.g., by calling the compiler to delete the function) and the compiler will realize code size savings. This technique may be expanded to other optimizations such as function merging, argument wrapping, and function placement.

Accordingly, if database 130 is in an inconsistent or corrupt state, the compiler may still be able to produce correct code in the presence of such database corruption via collaboration with the database. The produced code, however, may not be optimal code.

Furthermore, additional information in the database may be used to assist optimizations based on function size that do not affect correctness. For example, an optimization opportunity may be a segment of code that may be written inline a region of code, which may use additional size information as a part of a cost function to make such a decision.

IV. Compiler Optimizations

Figure 3:
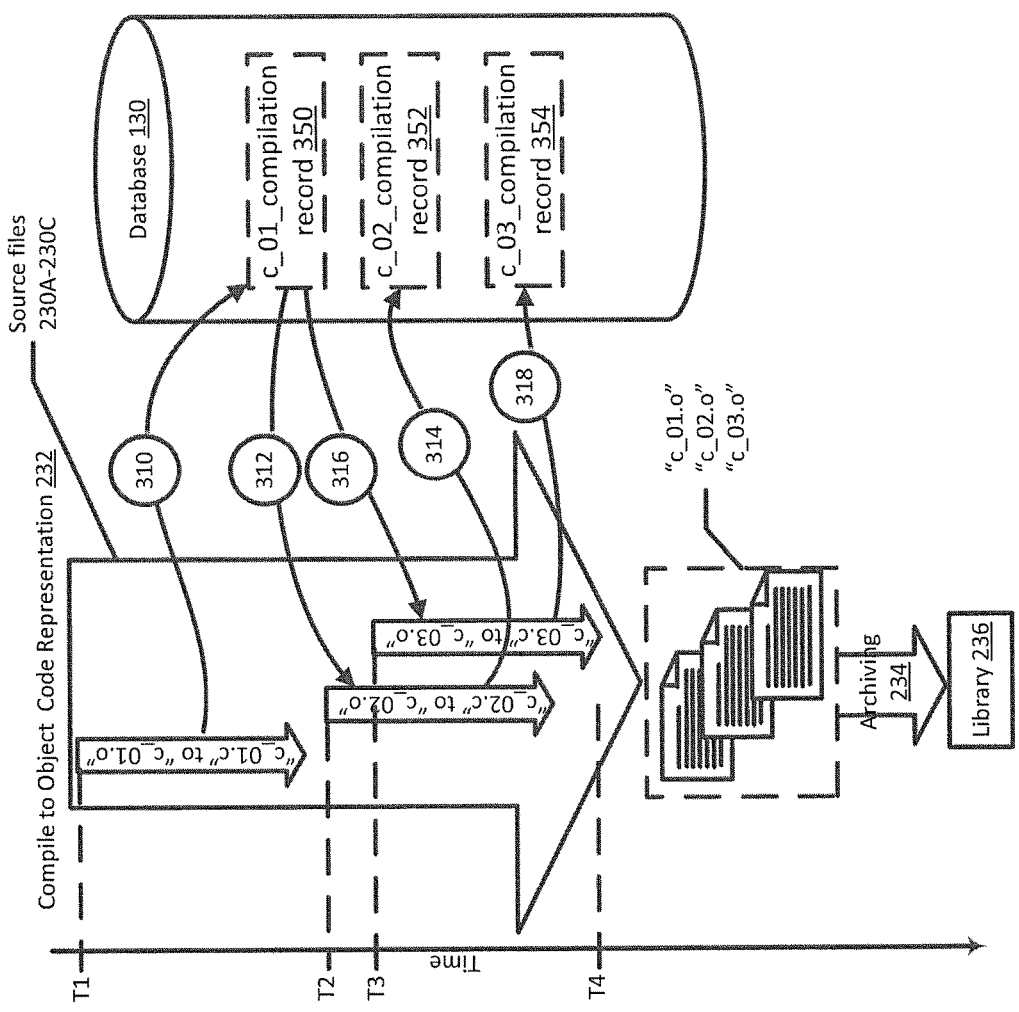
FIG. 3 is a timing diagram of source files being translated into an object code representation, according to some embodiments.

FIG. 3 is a timing diagram of source files 230A-230C being translated into an object code representation, according to some embodiments. In the following example, source file 230A may be "c_01.c," source file 230B may be "c_02.c," and source file 230C may be "c_03.c." Each of source files 230A-230C may be compiled independently from each other, and a compilation record including data collected during a compilation of one or more of these source files may be stored in database 130. If the source file has changed, its corresponding compilation record and dependent entries in database 130 may be invalidated.

A. Initial Compilation Run

Database 130 may be a "cold" database that is empty and includes no compilation records based on previous compilation runs. Compiler 106 may obtain source file 230A including high-level source code as input, and at time T1 compiler 106 may initiate compilation of source file 230A.

Compiler 106 compiles source file 230A by generating an object code representation of source file 230A (e.g., "c_01.o"). During the compilation of source file 230A, optimizer 104 may identify a segment of code in source file 230A as a potential optimization opportunity. Compiler 106 may search compilation records stored in database 130 to determine whether the identified segment of code in source file 230A is an actual optimization opportunity. The identified segment of code is an actual optimization opportunity if, for example, database 130 stores a compilation record indicating that the segment of code can be optimized based on data collected from one or more previous compilation runs. In this example, database 130 is a "cold" database that does not yet store any compilation records. Accordingly, compiler 106 may determine that the identified segment of code in source file 230A is not an actual optimization opportunity and may compile source file 230A as compiler 106 normally would.

At an action 310, optimizer 104 may create a compilation record 350 in database 130 and store data based on the segment of code in the compilation record. The data may indicate that the segment of code is an optimization opportunity and other information about the segment of code. Additionally, the data in compilation record 350 may be used by the compiler at a later point in time to optimize the compilation of other source files. In particular, optimizer 104 may store data regarding the potential optimization opportunity identified in the first source file, where the potential optimization opportunity may later be used to identify, in a second source file, a segment of code as being an actual optimization opportunity. In other words, data based on the potential optimization opportunity identified in the first source file may be stored in database 130 and used by the compiler to determine that a segment of code in the second source file is an actual optimization opportunity. The first segment of code identified in the first source file corresponds to the second segment of code identified in the second source file. In an example, the first segment of code may be interdependent or reference the second segment of code.

Optimizer 104 may be able to identify segments of code within the same file as being actual optimization opportunities without looking to database 130. Optimizer 104 may store data based on any segments of code identified by optimizer 104 as actual or potential optimization opportunities in database 130. Accordingly, during a subsequent compilation of a source file, compiler 106 may use the previously stored data to determine whether a segment of code identified as a potential optimization opportunity in a subsequently compiled source file is an actual optimization opportunity. An optimization opportunity may indicate function merging (merging two functions that are equivalent together), function abstraction, or argument wrapping.

Figure 4:
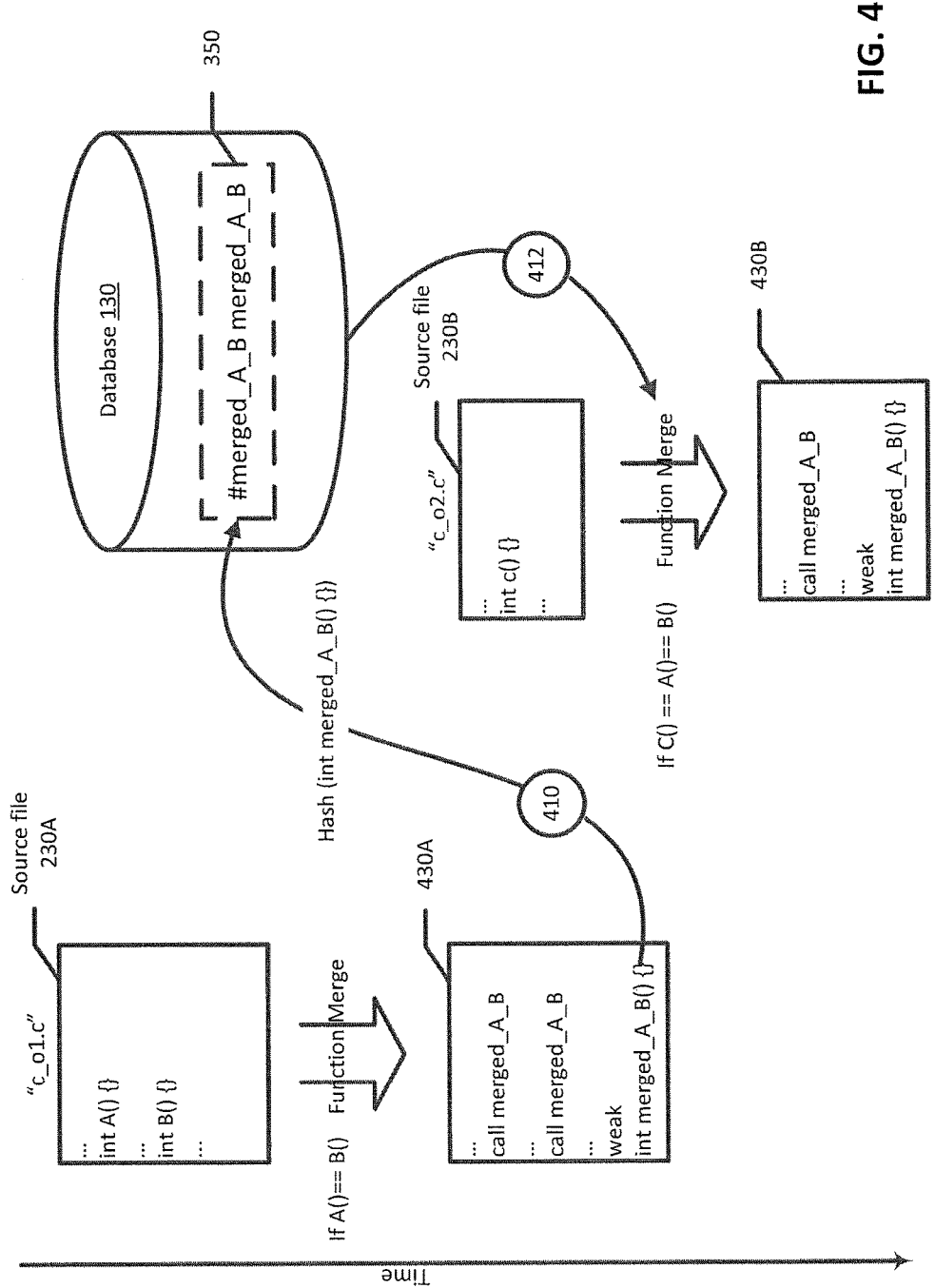
FIG. 4 is a block diagram illustrating segments of code that may be identified as actual optimization opportunities in source files, according to some embodiments.

FIG. 4 is a block diagram illustrating segments of code that may be identified as actual optimization opportunities in source files 230A and 230B by optimizer 104, according to some embodiments. FIGS. 3 and 4 will be discussed together to better explain compiler optimizations within a file and across files. In FIG. 4, source file 230A includes a function "A" and function "B," and optimizer 104 identifies these functions as being actual optimization opportunities. For example, optimizer 104 may determine that functions "A" and "B" are functionally equivalent and thus indicate function merging. As such, optimizer 104 may determine that functions "A" and "B" are actual optimization opportunities and that function "A" may be consistently replaced with function "B," or vice versa. In an example, functions "A" and "B" are identical. In another example, functions "A" and "B" are not identical and optimizer 104 is able to analyze the code in each of these functions and determine that they are functionally equivalent.

Optimizer 104 may determine a shared function name that identifies the equivalent functions. Each time function "A" or "B" is encountered linker 108 associates the original function name with the shared function name. In an example, the shared function name is one of the original function names (e.g., "A" or "B"). In this example, the shared function name may be "A" and function "B" may be renamed to "A," or vice versa. In another example, the shared function name is different from the original function names. In the example illustrated in FIG. 4, the shared function name is "merged_A_B" and replaces the use of the equivalent functions with a call to a single function identified by the shared function name. Accordingly, one copy of the function and one function name may be maintained and used, resulting in a smaller executable file compared to using both of the equivalent functions. A conceptual representation 430A illustrates the merging of the equivalent functions "A" and "B," and shows each instance of the function "A" or "B" replaced with a call to the shared function "merged_A_B."

Optimizer 104 may update database 130 with information about the redundant function in a variety of ways. In an example, the data based on the segment of code identified as an actual optimization opportunity is the actual code or a representation of the actual code of function "A" or "B." In this example, optimizer 104 stores the full source code or lower-level representation (e.g., object code representation or intermediate representation) of function "A" and/or function "B" in compilation record 350.

Storing the full representation, however, may consume a large amount of space in database 130. To solve this problem, at an action 410, optimizer 104 may generate a hash based on at least a portion of the full representation of function "A" and/or function "B" and store the hash as at least part of the data based on the segment of code identified as an optimization opportunity. The hash is a unique signature of a previously processed entity (e.g., function declaration, body, and parameters) and possibly some additional information. In an example, the hash is a unique signature of the shared function and does not include the name of the original function. It may be desirable for the hash to be big enough to ensure that two entities having the same hash are identical. In FIG. 4, optimizer 104 generates a hash "#merged_A_B", which is based on at least a portion of the full source code or lower-level representation of function "A" and/or function "B," and stores the hash in compilation record 350. Accordingly, database 130 stores a unique string to be used as the shared function name for all instances of functions "A" and "B." In another example, the data based on the segment of code identified as an optimization opportunity includes the location of the equivalent functions in the source file (e.g., line numbers).

B. One or More Subsequent Compilation Runs

Referring back to FIG. 3, compiler 106 may obtain source file 230B including high-level source code as input (e.g., "c_02.c"), and at time T2 compiler 106 may initiate compilation of source file 230B. Time T2 is after time T1, and the compilation of source file 230A may be completed before time T2. It should be understood that the compilation of source file 230A may or may not have started and/or completed at time T2. It should also be understood that times T1 and T2 may be the same or different. For example, the initiation of compilation of source files 230A and 230B may start at the same time or different times and/or may end at the same time or different times.

An embodiment of the disclosure may trade off time and complexity for disk space. Theoretically, all of the source files or libraries may be open at the same time and optimized. Doing so, however, may impact the compiler exponentially and compilation of the source files/libraries in this way may be very slow. Rather than compiling all of the source files/libraries at once, an embodiment may store data regarding the compilation of a source file/library into database 130 and reap some of the benefits of being provided with a global view of the program while individual source files or libraries are being compiled. The compilation runs may be distributed over time as pieces of a program are compiled and optimized one at a time in accordance with information gathered from previous compilations. Accordingly, it may be unnecessary for the entire code base to be available to the compiler at once.

1. Identify and Store Optimization Opportunities

In FIG. 3, by the start of time T2, compilation record 350 has already been stored in database 130 and stores data based on one or more segments of code in source file 230A that may be used to optimize the compilation of other source files (e.g., source file 230B). Compiler 106 compiles source file 230B by generating an object code representation of source file 230B (e.g., "c_02.o").

During the compilation of source file 230B, optimizer 104 may identify a segment of code in source file 230B as a potential optimization opportunity. Compiler 106 may search compilation records stored in database 130 to determine whether the identified segment of code in source file 230B is an actual optimization opportunity. In particular, compiler 106 may search for compilation records stored in database 130 to determine whether the identified segment of code in source file 230B may be optimized based on data collected from previous compilations. In doing so, compiler 106 may be informed of cross-file or cross-library information that is relevant to optimizing the compilation of source file 230B and may prepopulate the internal structure of the representation of source file 230B with data from database 130 as though source files 230A and 230B were being compiled at the same time.

At an action 312, compiler 106 may read compilation record 350, which stores data that may be used by compiler 106 to optimize the compilation of source file 230B. FIG. 4 provides an example of source file 230B ("c_02.c"), which includes a function "C" that optimizer 104 identifies as a segment of code that is a potential optimization opportunity. Compiler 106 may search database 130 to determine whether any compilation records store data collected from previous compilations that may be used to optimize the function "C." At an action 412 (corresponding to action 312 in FIG. 3), compiler 106 may read compilation record 350 in database 130, which may store data indicating that function "C" is equivalent to the shared function "merged_A_B." In an example, optimizer 104 determines that function "C" is functionally equivalent to the shared function "merged_A_B" (or to function "A" and/or function "B"), and thus indicates function merging. As such, optimizer 104 may determine that function "C" is an actual optimization opportunity and that function "C" may be consistently replaced with the shared function "merged_A_B." A conceptual representation 430B illustrates the merging of the equivalent functions "C" and "merged_A_B," and shows each instance of the function "C" replaced with a call to the shared function "merged_A_B."

Optimizer 104 may update database 130 with data based on the redundant function. Referring back to FIG. 3, during the compilation of source file 430B at an action 314, optimizer 104 may create a compilation record 352 in database 130 that stores data based on the segment of code identified as being a potential or actual optimization opportunity. In particular, compilation record 352 stores data based on the segment of code identified as an optimization opportunity in source file 430B (e.g., data about function "C"). The data may indicate that the segment of code is an optimization opportunity and may be used by compiler 106 to optimize subsequent compilation of other source files. In an example, optimizer 104 prepopulates internal structures of database 130 such that the content is maintained as local content for each compilation run. While the compilation run executes locally, hits to database 130 may be produced. When compiler 106 detects a hit to database 130 (e.g., a compilation record stores data relevant to compiling the current source file), compilation of the current source file proceeds as if the hit were local and information that affects the compilation of the current source file may be retrieved from database 130.

2. Compile Current Source File

If compiler 106 identifies a compilation record storing data indicating that the segment of code in source file 230B is an actual optimization opportunity, compiler 106 compiles source file 230B in accordance with the actual optimization opportunity indicated in the compilation record. In keeping with the above example, compilation record 350 may store data indicating that the segment of code in source file 230B is an actual optimization opportunity. Compiler 106 may read compilation record 350 between Times T2 and T4, and generate a representation of the high-level source code in source file 230B in accordance with the actual optimization opportunity. The representation may include an indication that source file 230B may be optimized by replacing function "C" with the shared function "merged_A_B." For example, the compiler may mark function "C" as a weak linkage function by inserting the keyword "weak" before the shared function "merged_A_B" in the compiled file (see conceptual representation 430B in FIG. 4).

Optimizer 104 and compiler 106 may continue to perform these actions until each of the source files in each of the libraries that make up the program is compiled. In an example, compiler 106 obtains source file 230C and optimizer 104 identifies a segment of code in source file 230C as a potential optimization opportunity. At an action 316, compiler 106 may identify and read compilation record 350, which stores data indicating that the segment of code in source file 230C is an actual optimization opportunity. The data may be based on a previous compilation of a source file (e.g., source file 230A and/or source file 230B). At an action 318, optimizer 104 may create a compilation record 354 in database 130, where compilation record 354 is based on the potential and/or actual optimization opportunities in source file 230C. Compiler 106 may then generate a representation of the high-level source code included in source file 230C in accordance with the actual optimization opportunity. It should be understood that actions 310-318 may occur in a different order from that described. For example, action 316 may occur before action 314. When the last source file is compiled, database 130 is fully populated (may be referred to as a "hot" database) and has information about the entire program build.

C. Example of Compilation of Separate Libraries

Figure 5:
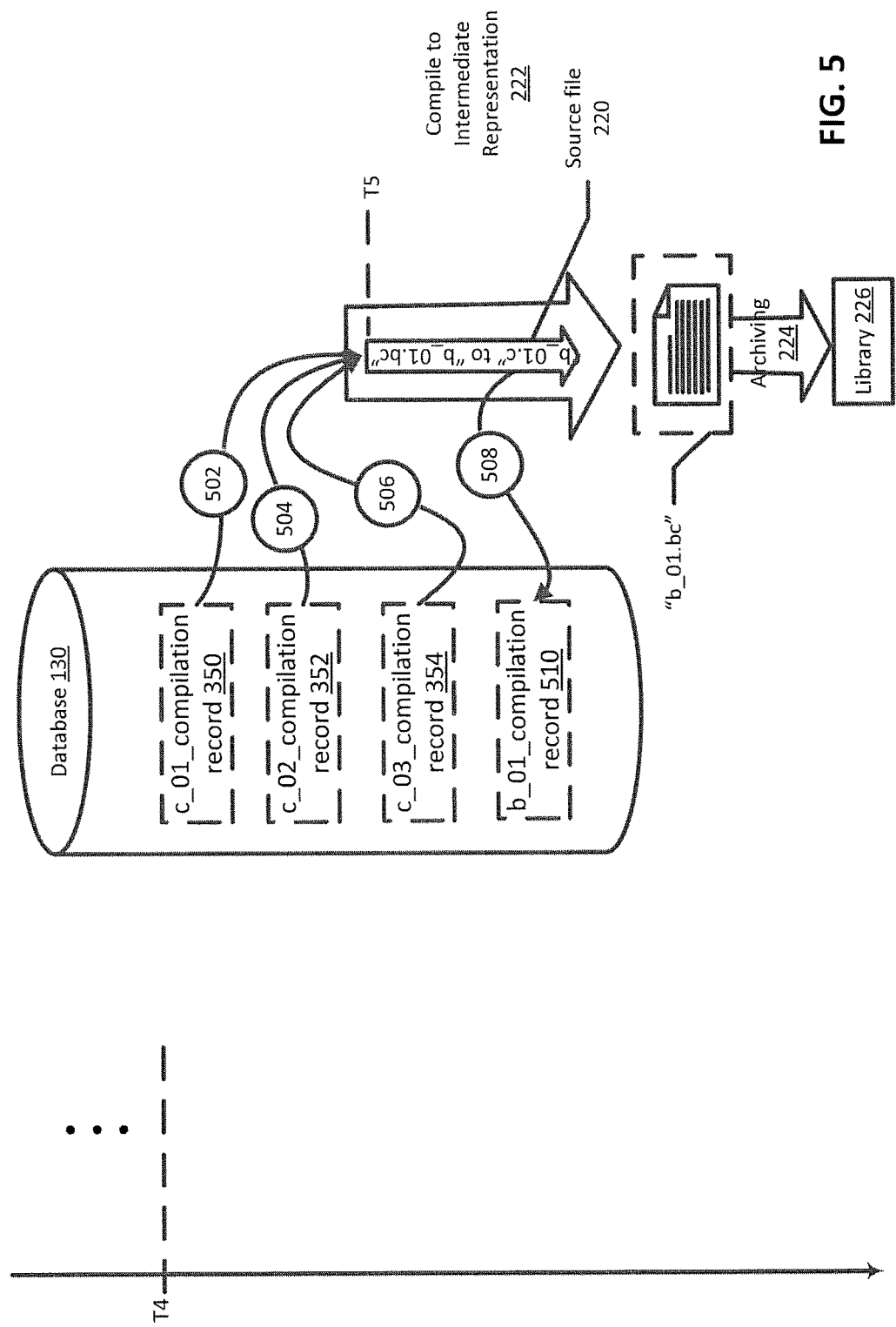
FIG. 5 is a timing diagram of source files being translated into an object code representation, and a source file being translated into an intermediate representation in relation to FIG. 3, according to some embodiments.

FIG. 5 is a timing diagram of source files being translated into an object code representation, and a source file being translated into an intermediate representation in relation to FIG. 3, according to some embodiments. In FIG. 5, information on compilation runs is shared across libraries, and database 130 is warm (stores compilation records but is not fully populated). Source file 220 may be "b_01.c" in FIG. 5. Compiler 106 may obtain source file 220 including high-level source code as input, and at time T5 compiler 106 may initiate compilation of source file 220. In FIG. 5, time T5 is after times T1, T2, and T3 in the timing diagram.

Compiler 106 compiles source file 220 by generating an intermediate representation of source file 220 (e.g., "b_01.bc"). It may be desirable for compiler 106 to generate an intermediate representation of source code rather than an object code representation because the intermediate representation is more platform independent compared to an object code representation and may be better optimized by the compiler. Additionally, the further the representation descends from the original code, the less the compiler may know about the original intent of the code and the more difficult it may be to make changes to it. It should also be appreciated that object code representation may be used and helpful to optimizing code.

During the compilation of source file 220, optimizer 104 may identify a segment of code in source file 220 as a potential optimization opportunity. Compiler 106 may search compilation records stored in database 130 to determine whether the identified segment of code in source file 220 is an actual optimization opportunity. In FIG. 5, at actions 502, 504, and 506, compiler 106 may identify and read compilation records 350, 352, and 354, respectively, which were created based on compilation of source files in a library different from the library that source file 220 is in. Accordingly, while compiler 106 is in the process of compiling source file 220, compiler 106 may use data based on previously and independently compiled source files 230A-230C (e.g., c_01.c, c_02.c, and c_03.c in FIG. 3) grouped in a separate library to optimize the compilation of source file 220.

One or more of these compilation records may store data collected from previous compilations and may be used to optimize the segment of code identified in source file 220 as being a potential optimization opportunity. If the identified segment of code in source file 220 is an actual optimization opportunity, compiler 106 may compile source file 220 in accordance with the actual optimization opportunity and indicate how to optimize the identified section of code in the compiled file. If the identified segment of code in source file 220 is not an actual optimization opportunity, compiler 106 may compile source file 220 as compiler 106 normally would.

In FIG. 5, at an action 508, optimizer 104 may create a compilation record 510 in database 130 and store data based on the segment of code in source file 220 identified as a potential optimization opportunity and/or actual optimization opportunity in the compilation record. The data may indicate that the segment of code is an optimization opportunity and other information about the segment of code. Additionally, the data in compilation record 510 may be used by the compiler at a later point in time to optimize the compilation of other source files.

Figure 6:
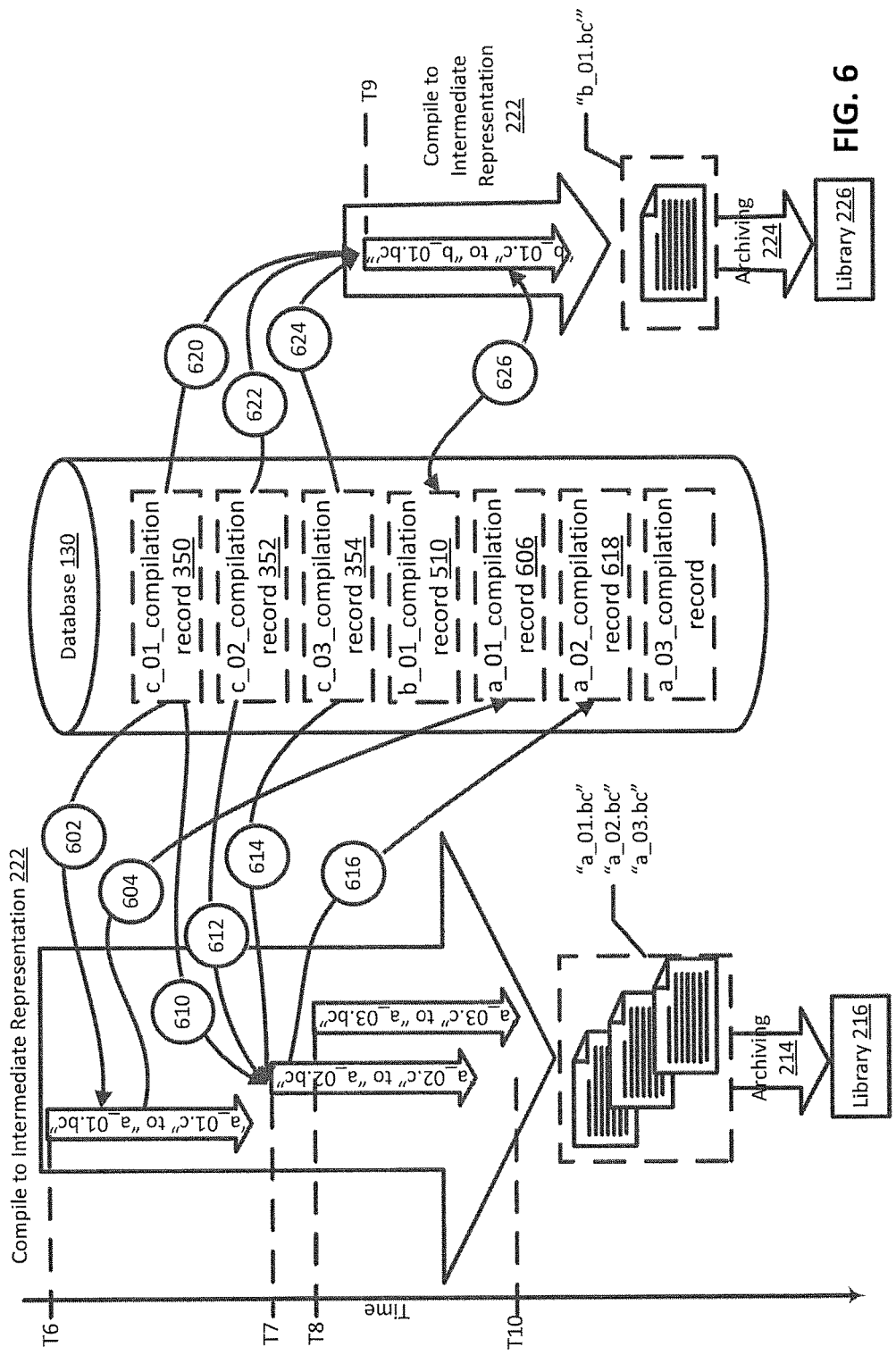
FIG. 6 is a timing diagram of source files grouped in different libraries being translated into an intermediate representation, according to some embodiments.

FIG. 6 is a timing diagram of source files grouped in different libraries being translated into an intermediate representation, according to some embodiments. In FIG. 6, information on compilation runs is shared across files and libraries, and database 130 is "warm" (stores compilation records but is not fully populated). In the following example, source file 210A may be "a_01.c," source file 210B may be "a_02.c," and source file 210C may be "a_03.c." When compiling current source files 210A-210C grouped into library 216, compiler 106 may use the previously created compilation records to determine whether the current source files include segments of code that are actual optimization opportunities.

Compiler 106 may obtain source file 210A including high-level source code as input, and at time T6 compiler 106 may initiate compilation of source file 210A. In FIG. 6, time T6 may be after time T5 in the timing diagram (see FIG. 5). As such, time T6 may also be after times T1, T2, T3, and T4 in FIG. 3.

Compiler 106 compiles source file 210A by generating an intermediate representation of source file 210A (e.g., "a_01.bc"). During the compilation of source file 210A, optimizer 104 may identify a segment of code in source file 210A as a potential optimization opportunity. At an action 602, compiler 106 reads compilation record 350, which may store data indicating that the identified segment of code in source file 210A is an actual optimization opportunity. Compiler 106 may also read compilation records 352 and 354 and determine that they do not store data indicating that the identified segment of code in source file 210A is an actual optimization opportunity. Accordingly, compiler 106 may compile source file 210A in accordance with the actual optimization opportunity as indicated in compilation record 350. During the compilation of source file 210A and at an action 604, optimizer 104 may create a compilation record 606 in database 130 and store data based on the segment of code identified as an actual optimization opportunity or potential optimization opportunity in the compilation record.

Compiler 106 compiles source file 210B by generating an intermediate representation of source file 210B (e.g., "a_02.bc"). During the compilation of source file 210B, optimizer 104 may identify a segment of code in source file 210B as a potential optimization opportunity. At actions 610, 612, and 614, compiler 106 reads compilation records 350, 352, and 354, respectively, which may store data indicating that the identified segment of code in source file 210B is an actual optimization opportunity. Accordingly, compiler 106 may compile source file 210B in accordance with the actual optimization opportunity. During the compilation of source file 210B and at an action 616, optimizer 104 may create a compilation record 618 in database 130 and store data based on the segment of code identified as an actual optimization opportunity or potential optimization opportunity in the compilation record. Optimizer 104 and compiler 106 may perform similar actions for source file 210C.

One or more of the source files that have already been compiled may be compiled again and may generate a representation different from the original representation that was originally produced. As discussed the compilation process may be an iterative process that updates data in database 130. Additionally, any change to database 130 may cause subsequent changes to the compilation of a source file.

In FIG. 6, compiler 106 compiles source file 220B for the second time (the first compilation of source file 220B is illustrated in FIG. 5). When compiling source file 220B for the first time, compiler 106 may have made some decisions based on previous content (e.g., data stored in compilation records 350, 352, or 354) stored in database 130. At actions 620, 622, and 624, compiler 106 reads compilation records 350, 352, and 354, respectively, for the second time. One or more of these compilation records may store different data compared to the data stored in these compilation records in FIG. 5. For example, compilation record 350 may have been updated since then based on optimizer 104 realizing that a call to a function in source file 230A ("c_01.c") returns a constant value. Compiler 106 may be able to use that new knowledge to replace a call to that function in source file 220 ("b_01.c") with the constant value.

Accordingly, compiler 106 may compile source file 220 in accordance with the actual optimization opportunity (which includes the new knowledge) and generate a second intermediate representation of the high-level source code in accordance with the actual optimization opportunity, where the second intermediate representation (illustrated as "b_01.bc'") is different from the first intermediate representation in FIG. 5 (illustrated as "b_01.c"). During the compilation of source file 220 and at an action 626, optimizer 104 may update compilation record 510 in database 130 and store the new data based on the segment of code identified as an actual optimization opportunity or potential optimization opportunity in the compilation record. For example, optimizer 104 may update compilation record 510 such that it stores the function name and the returned constant value.

D. Link the Libraries

Linker 108 combines the lower-level representation files generated by compiler 106 to create a single executable file. For example, linker 108 links multiple libraries together by resolving references in the compiled files and links them to an executable file. Linker 108 may perform LTO on the linked libraries and garbage collection. The input to the linking stage is the collection of libraries (e.g., libraries 216, 226, and 236) created by the previously completed compiling stage. Linker 108 may perform the optimizations during the LTO stage.

During the LTO stage, linker 108 may identify each segment of code in the compiled file (e.g., intermediate representation file or object code file) that is an actual optimization opportunity and may make a call to compiler 120 to cause it to produce the representation in accordance with the one or more actual optimization opportunities. In an example, linker 108 invokes a call to compiler 106 that causes it compiler to include the actual optimization opportunity in an optimized representation of the representation initially produced by the compiler.

Additionally, linker 108 may perform garbage collection before the final linking step that generates the final executable file. During garbage collection, linker 108 may ensure that unnecessary code is not placed in the final executable file.

E. Subsequent Program Build

When the last source file in the program is compiled, database 130 may be a "hot" database that is fully populated with information about each library in the program. After the first program build, the user may decide to keep database 130 as is (not empty it) and to perform a second program build. At this point, database 130 may have information about all of the compiled libraries that were previously compiled and optimized.

During the second program build, optimizer 104 incorporates the optimizations from the previously compiled libraries, and the code may be reanalyzed for further optimizations. For example, compilation process 200 illustrated in FIG. 2 may be repeated multiple times and each compilation may improve the quality of the code that is generated because database 130 will continue to be updated with new optimization opportunities. Additionally and as described in relation to FIG. 6, each subsequent compilation may yield a different result. Each iteration may improve the quality of the code because more information about the code is known and the compilation records are accordingly updated with the new information. It is up to the customer to decide the feasibility of additional compilations or builds.

As discussed above and further emphasized here, FIGS. 1-6 are merely examples, which should not unduly limit the scope of the claims. For example, one or more modules (e.g., optimizer 104, compiler 106, and linker 108) in FIG. 1 may be combined with another module. It should also be understood that one or more modules in FIG. 1 may be separated into more than one module.

V. Example Method

Figure 7:
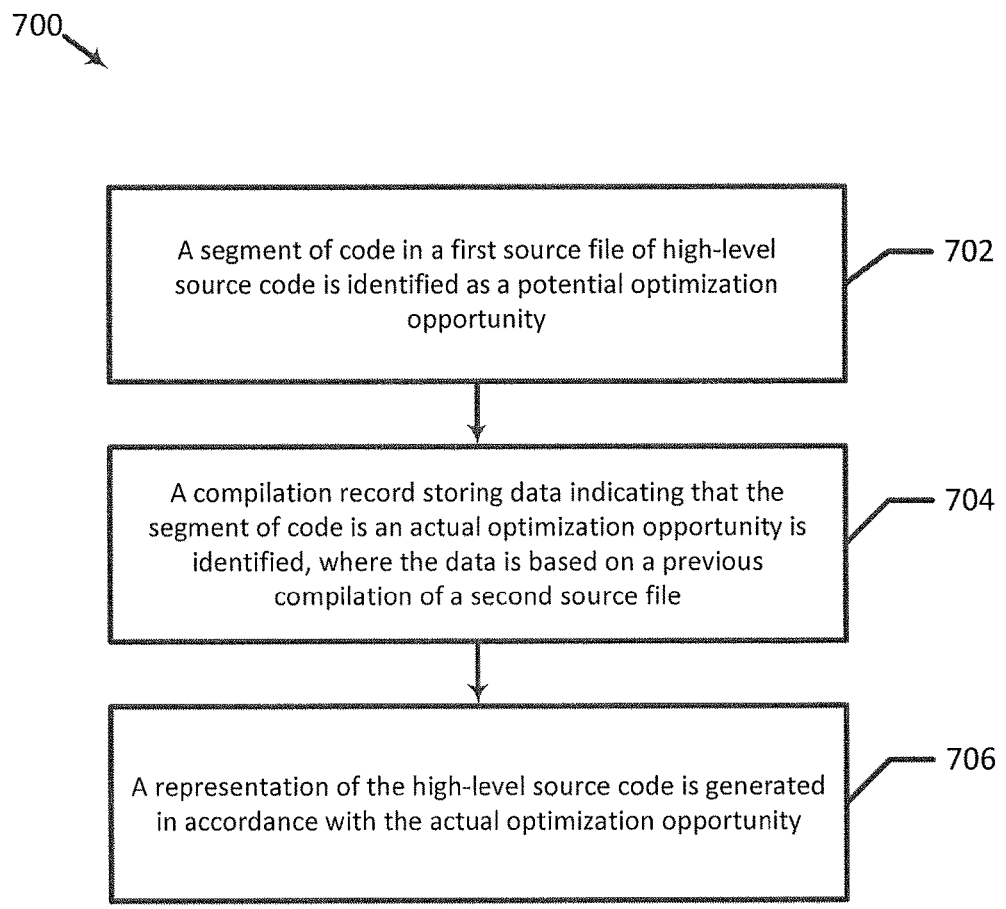
FIG. 7 is a simplified flowchart illustrating a method of compiling a source file including high-level source code, according to some embodiments.

FIG. 7 is a simplified flowchart illustrating a method 700 for compiling a source file including high-level source code, according to some embodiments. Method 700 is not meant to be limiting and may be used in other applications.

Method 700 includes blocks 702-706. In a block 702, a segment of code in a first source file of high-level source code is identified as a potential optimization opportunity. In an example, optimizer 104 identifies a segment of code in source file 230B as a potential optimization opportunity. Source file 230B includes high-level source code. In a block 704, a compilation record storing data indicating that the segment of code is an actual optimization opportunity is identified, where the data is based on a previous compilation of a second source file. In an example, compiler 106 identifies compilation record 350 storing data indicating that the segment of code is an actual optimization opportunity, where the data is based on a previous compilation of source file 230A. In a block 706, a representation of the high-level source code is generated in accordance with the actual optimization opportunity. In an example, compiler 106 generates a representation of the high-level source code in accordance with the actual optimization opportunity.

In some embodiments, blocks 702-706 may be performed for any number of source files in a library. It is also understood that additional processes may be performed before, during, or after blocks 702-706 discussed above. It is also understood that one or more of the blocks of method 700 described herein may be omitted, combined, or performed in a different sequence as desired.

VI. Example Computer System

Figure 8:
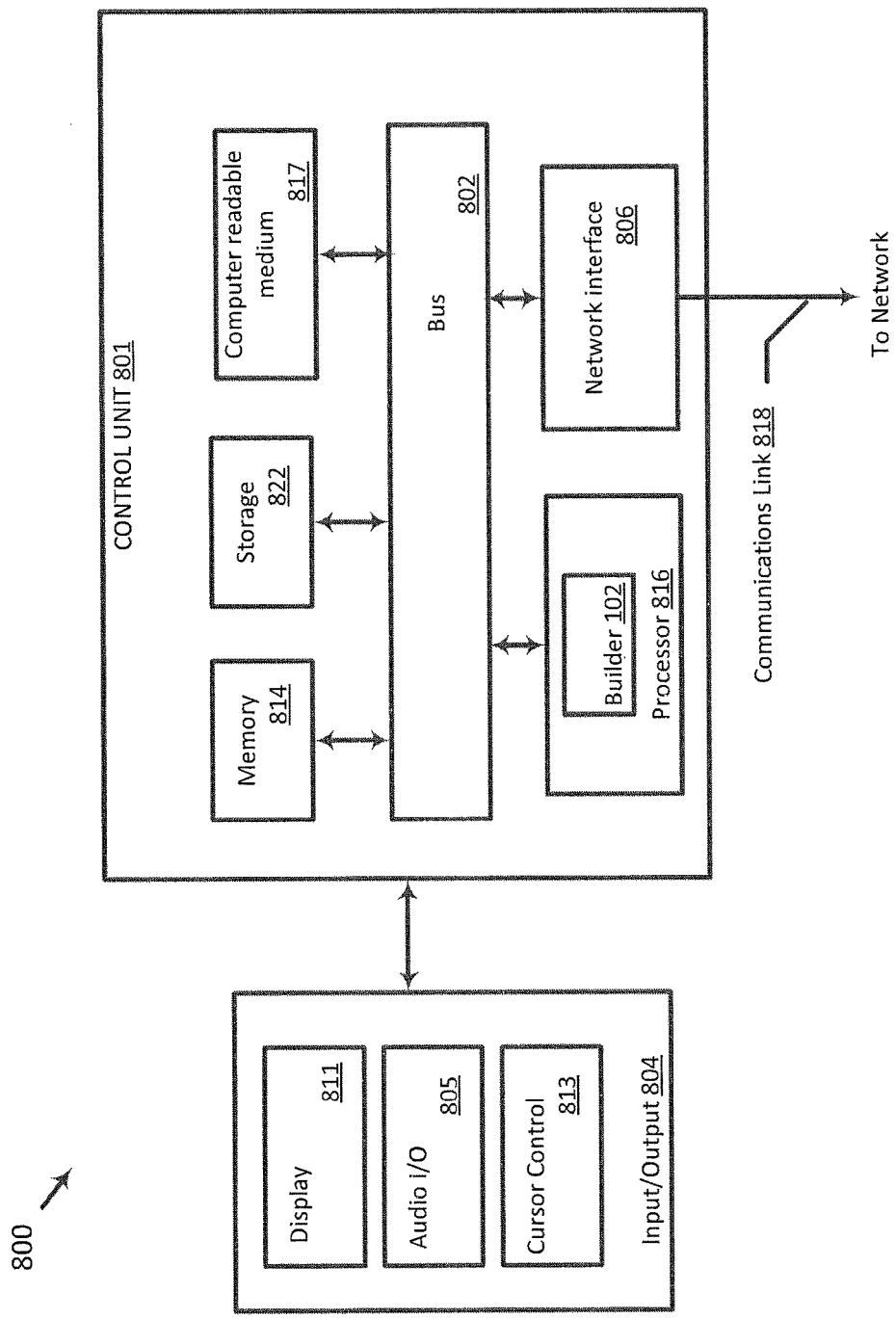
FIG. 8 is a block diagram of a computer system suitable for implementing one or more embodiments of the present disclosure.

FIG. 8 is a block diagram of an example computer system 800 suitable for implementing any of the embodiments disclosed herein. In various implementations, builder 108 may execute on computer system 800. The computer system 800 may include one or more processors 816. The computer system 800 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to computer system 800 using a computer network (not shown). The computer network may be any type of network including a LAN, a WAN, an intranet, the Internet, a cloud, and/or any combination of networks thereof that is capable of interconnecting computing devices and/or computer programs in the system.

Computer system 800 includes a bus 802 or other communication mechanism for communicating information data, signals, and information between various components of computer system 800. Components include an input/output (I/O) component 804 for processing user actions, such as selecting keys from a keypad/keyboard or selecting one or more buttons or links, etc., and sends a corresponding signal to bus 802. I/O component 804 may also include an output component such as a display 811, and an input control such as a cursor control 813 (such as a keyboard, keypad, mouse, etc.).

An audio I/O component 805 may also be included to allow a user to use voice for inputting information by converting audio signals into information signals. Audio I/O component 805 may allow the user to hear audio. A transceiver or network interface 806 transmits and receives signals between computer system 800 and other devices via a communication link 818 to a network. In an embodiment, the transmission is wireless, although other transmission mediums and methods may also be suitable. A processor 816, which may be a micro-controller, digital signal processor (DSP), or other processing component, processes these various signals, such as for display on display 811 of computer system 800 or transmission to other devices via communication link 818. Builder 102 may execute in processor 816. Processor 816 may also control transmission of information, such as cookies or IP addresses, to other devices.

Components of computer system 800 also include a system memory component 814 (e.g., RAM), a static storage component 822 (e.g., ROM), and/or a computer readable medium 817. Computer system 800 performs specific operations by processor 816 and other components by executing one or more sequences of instructions contained in system memory component 814. Logic may be encoded in computer readable medium 817, which may refer to any medium that participates in providing instructions to processor 816 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 814, and transmission media include coaxial cables, copper wire, and fiber optics, including wires that include bus 802.

In an embodiment, the logic is encoded in non-transitory computer readable medium. Computer readable medium 817 may be any apparatus that can contain, store, communicate, propagate, or transport instructions that are used by or in connection with processor 816. Computer readable medium 817 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 700) to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of compiling a source file, the method implemented with a processor equipped with memory-stored instructions, which when executed by the processor, cause the processor to perform the method, comprising:
   identifying a first source code segment in a first source file as a potential optimization opportunity, the first source code segment including a first call to a first function;
   identifying a compilation record storing data indicating that the first source code segment is an actual optimization opportunity, the data being based on a previous compilation of a second source file including a second source code segment that includes a second call to a second function, and the second function being functionally equivalent to the first function and associated with the data;
   generating a first lower-level representation of the second source file, wherein the generating a first lower-level representation includes marking the second call to the second function as being replaceable with a shared function;
   generating an optimized representation of the first lower-level representation by replacing the marked second call to the second function with the shared function; and
   compiling the first source file, wherein compiling the first source file includes generating a second lower-level representation of the first source file in accordance with the actual optimization opportunity by marking the first call to the first function as being replaceable with the shared function, wherein compiling the first source file further includes generating an optimized representation of the second lower-level representation by replacing the marked first call to the first function with the shared function.

2. The method of claim 1, wherein the generating a second lower-level representation includes generating an intermediate representation or an object code representation of the first source file.

3. The method of claim 1, further comprising:
identifying the second source code segment as a second potential optimization opportunity; and
storing second data in a database, the second data being based on the second source code segment and indicating one or more actual optimization opportunities for the first source code segment.

4. The method of claim 3, wherein the storing includes generating a hash based on the second source code segment and storing the hash corresponding to the second source code segment in the database.

5. The method of claim 1, wherein the first source file includes first high-level source code that is written in a high-level programming language, the method further comprising:
obtaining the second source file including second high-level source code that is written in the high-level programming language;
archiving the first lower-level representation into a first library; and
archiving the second lower-level representation into a second library.

6. The method of claim 1, further comprising:
invoking, from a linker, a call to a compiler that causes the compiler to include the actual optimization opportunity in the optimized representation of the second lower-level representation.

7. The method of claim 1, further comprising:
obtaining the first source file including high-level source code;
identifying the first source code segment in the first source file as a second potential optimization opportunity;
identifying a second compilation record storing second data indicating that the first source code segment is a second actual optimization opportunity, the second data being updated based on a previous compilation of a third source file; and
generating a third lower-level representation of the high-level source code in accordance with the second actual optimization opportunity, the second lower-level representation being different from the third lower-level representation.

8. The method of claim 7, wherein the third source file includes a third source code segment, and the first source code segment and the third source code segment are interdependent.

9. The method of claim 1, wherein the first function returns a value, the method further comprising:
marking the first call as being replaceable with the value.

10. The method of claim 9, wherein the value is a constant value.

11. The method of claim 1, wherein the first source code segment includes a third call to a third function that is functionally equivalent to the second function, wherein the generating a second lower-level representation further includes marking the third call to the third function as being replaceable with the second call to the second function, and wherein the generating an optimized representation of the second lower-level representation includes replacing the marked third call to the third function with the second call to the second function.

12. The method of claim 11, further comprising:
generating a first hash based on the second function;
storing the first hash as at least part of the data in the compilation record; and
generating a second hash based on the third function, wherein the identifying a compilation record includes determining that the first hash matches the second hash.

13. A system for compiling a source file, the system including a computer and memory having processor-executable programs for implementing the system optimizer, and compiler functionalities, comprising:
an optimizer that identifies a first source code segment in a first source file as a potential optimization opportunity, wherein the first source code segment includes a first call to a first function;
a memory that stores a compilation record storing data indicating that the first source code segment is an actual optimization opportunity, wherein the data is based on a previous compilation of a second source file including a second source code segment that includes a second call to a second function, and the second function is functionally equivalent to the first function and is associated with the data; and
a compiler that generates a first lower-level representation of the second source file, marks the second call in the first lower-level representation as being replaceable with a shared function, generates an optimized representation of the first lower-level representation by replacing the marked second call to the second function with the shared function, generates a second lower-level representation of the first source file in accordance with the actual optimization opportunity, marks the first call in the second lower-level representation as being replaceable with the shared function, and generates an optimized representation of the second lower-level representation by replacing the marked first call to the first function with the shared function.

14. The system of claim 13,
wherein a database stores one or more compilation records, each compilation record being based on a compilation run of a given source file and storing data based on a given source code segment identified in the given source file as a potential optimization opportunity.

15. The system of claim 13, wherein the second lower-representation is an intermediate representation or an object code representation.

16. The system of claim 13, further comprising:
a linker that links one or more representations of one or more source files into an executable file.

17. The system of claim 16, wherein the linker invokes a call to the compiler that causes the compiler to optimize the representation of the second lower-level representation in accordance with the actual optimization opportunity.

18. A computer-readable medium having stored thereon computer-executable instructions for performing operations, the instructions to be executed by a processor attached with the medium to perform the operations, comprising:
identifying a first source code segment in a first source file as a potential optimization opportunity, the first source code segment including a first call to a first function;
identifying a compilation record storing data indicating that the first source code segment is an actual optimization opportunity, the data being based on a previous compilation of a second source file including a second source code segment including a second call to a second function that is functionally equivalent to the first function;

generating a first lower-level representation of the second source file, wherein the generating a first lower-level representation includes marking the second call to the second function as being replaceable with a shared function;

generating an optimized representation of the first lower-level representation by replacing the marked second call to the second function with the shared function;

compiling the first source file, wherein compiling the first source file includes generating a second lower-level representation of the first source file in accordance with the actual optimization opportunity by marking the first call to the first function as being replaceable with the shared function, wherein compiling the first source file further includes generating an optimized representation of the second lower-level representation by replacing the marked first call to the first function with the shared function.

19. The computer-readable medium of claim 18, wherein generating the second lower-level representation includes generating an intermediate representation or an object code representation.

* * * * *